G. E. MANN.
MAP-RACKS.

No. 180,898.

Patented Aug. 8, 1876.

Witnesses:
T. H. Parsons.
J. R. Drake.

Geo. E. Mann
Inventor, By
J. R. Drake
Atty.

UNITED STATES PATENT OFFICE.

GEORGE E. MANN, OF BUFFALO, NEW YORK.

IMPROVEMENT IN MAP-RACKS.

Specification forming part of Letters Patent No. 180,898, dated August 8, 1876; application filed April 17, 1876.

*To all whom it may concern:*

Be it known that I, GEORGE EDWARD MANN, of Buffalo, in the county of Erie and State of New York, have made certain Improvements in Map-Racks, of which the following is a specification:

This invention is more especially intended for large maps, such as are used in city or other public offices, and to which frequent reference and additions are made; the object of the invention being to keep the map always in good order, and at the proper tension, so that it will not sag, crack, or become defaced or injured, and that any portion of it can be readily seen, or worked upon as it stands.

The invention consists in the arrangement of a series of rollers, the two central ones, to which the ends of the map are attached, operated by cog-wheels and a crank on one end, and friction-wheels on the other ends, or friction-wheels alone may be used, or cogs only. It further consists in an automatic compensating-roller working in slides or slots, by which the slack of the map will always be taken up, so as to allow for the greater or lesser body of the map being on one of the central rollers. It finally consists in the application to the map-rack of a stationary drawing-board, which sets immediately behind and against the back of the map, so that it presents a solid back to the same, and allows changes or additions to be made on the map as it stands, without having (as now) to take the map from the rollers and lay it on a suitable table, all as hereinafter more particularly described.

Figure 1:
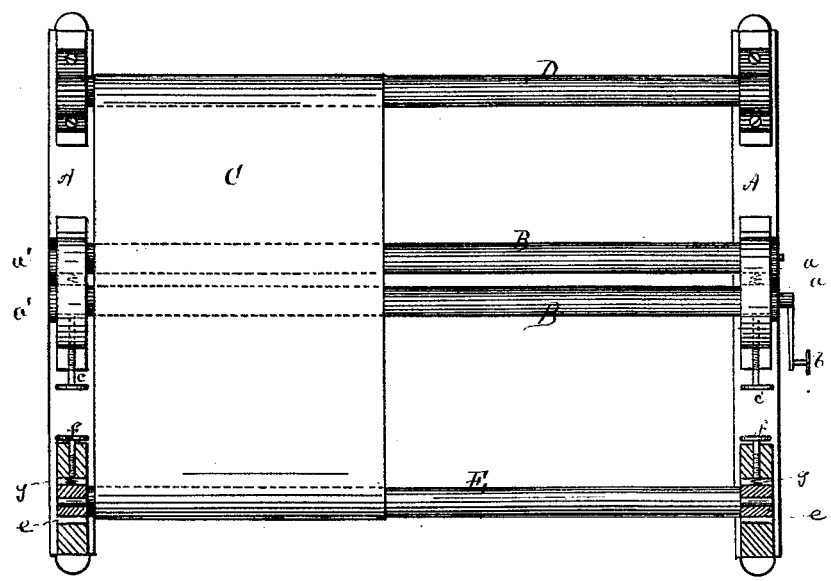
Figure 2:
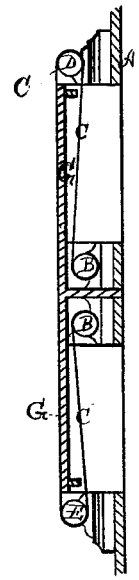

In the drawings, Figure 1 is a front elevation, partly in section; Fig. 2, a side elevation, in section, showing the position of the rollers, the drawing-board, &c.

A A are the side frames of a map-case, to be attached to the wall, or in an independent stand or case, as may be most convenient. B B are two central rollers, to which the ends of the map C are attached, the ends of the rollers working in the frame A A. $a\ a$ are small cog-wheels meshing into each other, and attached to the ends of said rollers, and operated by a crank, $b$. The other ends of the rollers are supplied with friction-wheels $a'\ a'$, so as to keep an even motion, and adjusting-screws $c\ c$ may be used to tighten or loosen them, if desired. The map C rolls or unrolls on the central rollers B B, but to display the map an additional roller, D, is arranged on the top of the frame, over which the map runs, coming down in front of the rollers B, and over a lower roller, E, in the bottom of the frame, said frame being made as high and as wide as the size of the map requires. The bottom roller E is to take up the slack by the unequal paying off, and taking on of the map when the middle rollers are operated. For example, when the map is wound entirely upon the upper middle roller B, and it is desired to unwind it, the body of the map being on said roller, it will pay off faster than the lower central roller will wind it. When this occurs the compensating-roller E drops down in the slides $e\ e$ of the frame A A, and into the slack of the map, thereby keeping it straight, and causing the map to wind snug to either of the central rollers. When the map is all on the lower central roller, and it is desired to wind it up, the upper central roller will not take on as fast as necessary, and the compensating-roller E again keeps it properly adjusted. This is an important feature of my invention. An adjusting screw, $f$, will regulate the play of the slides, and springs $g\ g$ may be used, if necessary, but usually the weight of the lower roller will be sufficient to return it to its place. As the map pays off one central roller it winds on the other, as before described. G represents a drawing-board, set immediately behind the map, (see Fig. 2,) attached at the sides to the main frame A A. It will be made of seasoned wood, so as to always present a flat surface, forming a back to the map. It not only aids in keeping the map flat, so that it can be easily seen in all its parts, but it serves the important use in city offices of permitting proper parties to make changes on any part of the map as it stands without having to take it down, it forming a drawing-board back to the map for that purpose. This will be found to be very important and useful.

The special advantages of this improved map-rack are, that the rollers are all connected, and are turned together by the use of the cogs or friction-wheels; also, by the use of the compensating or self-adjusting roller, the feed off or on of the map upon the rollers proper is governed or adjusted.

By the use of these devices, and the drawing-board back, the map need never be taken down or removed from the rollers, it allowing any portion of it to be plainly seen by a few turns of the crank. It does not wear the map, fold, wrinkle, crack, or crease it, and is easily handled.

I claim—

1. In a map-rack, the map-rollers B B operated by cog or friction wheels a a' at the ends of said rollers, and in combination with the upper and lower rollers D E, as and for the purpose specified.

2. In a map-rack, the lower or compensating roller E, working automatically in slides or slots e e, and in combination with the operating-rollers B B, all constructed and arranged to operate substantially as described.

In witness whereof I have hereunto signed my name in the presence of two subscribing witnesses.

GEO. E. MANN.

Witnesses:
  J. R. DRAKE,
  T. H. PARSONS.